United States Patent [19]

Meyer

[11] 4,192,580
[45] Mar. 11, 1980

[54] TOY MICROSCOPE

[75] Inventor: Burton C. Meyer, Downers Grove, Ill.

[73] Assignee: Marvin Glass & Associates, Chicago, Ill.

[21] Appl. No.: 825,197

[22] Filed: Aug. 17, 1977

[51] Int. Cl.² ............................................. G02B 27/02
[52] U.S. Cl. ................................. 350/238; D21/109; 46/126
[58] Field of Search ..................... 46/126, 17, 123, 1 R, 46/145, 146; 350/238, 235, 8, 12; D34/2 R, 15, 15 B; D16/52, 57; 35/91

[56] References Cited
U.S. PATENT DOCUMENTS

| 206,387 | 7/1878 | Bowen | 46/17 |
| 961,968 | 6/1910 | Kennedy | 46/123 |
| 3,360,641 | 12/1967 | Korte | 350/238 |
| 3,535,817 | 10/1970 | Fischer | 350/238 |
| 3,830,560 | 8/1974 | Onanian | 350/238 |

OTHER PUBLICATIONS

Montgomery Ward X-catalogue, 1976 p. 336 copyright 1977, non professional microscope #48T 20287
Optical instruments for examining and analysing metal 1932, p. 64, Bausch & Lomb advertisement B & L Rochester N.Y.
Bausch & Lomb, 1931, GS Stability Balance advertisement B & L Rochester, N.Y.

Primary Examiner—John K. Corbin
Assistant Examiner—B. W. de los Reyes
Attorney, Agent, or Firm—Mason, Kolehmainen, Rathburn & Wyss

[57] ABSTRACT

A toy microscope for children comprises a base and a body extending upwardly of the base with a hollow head portion at the upper end of the body. An eye piece is provided at the upper end of the head and is formed in the shape of a cap or hat. Objects to be viewed through the lens are supported on a flower-like platform which is carried at the outer end portion of a pair of legs, pivotally secured to the base and decorated to resemble the legs of a grasshopper or other insect. The leg structure is pivotal from a generally horizontal position wherein objects to be viewed can be readily placed on the platform and removed therefrom. The platform is movable to an upwardly sloped, viewing position where the objected to be inspected are held at a selected spaced relationship from the lens in the head. An over-center locking mechanism is provided to retain the leg structure and platform in the lower position until released by depression of an actuating lever.

3 Claims, 3 Drawing Figures

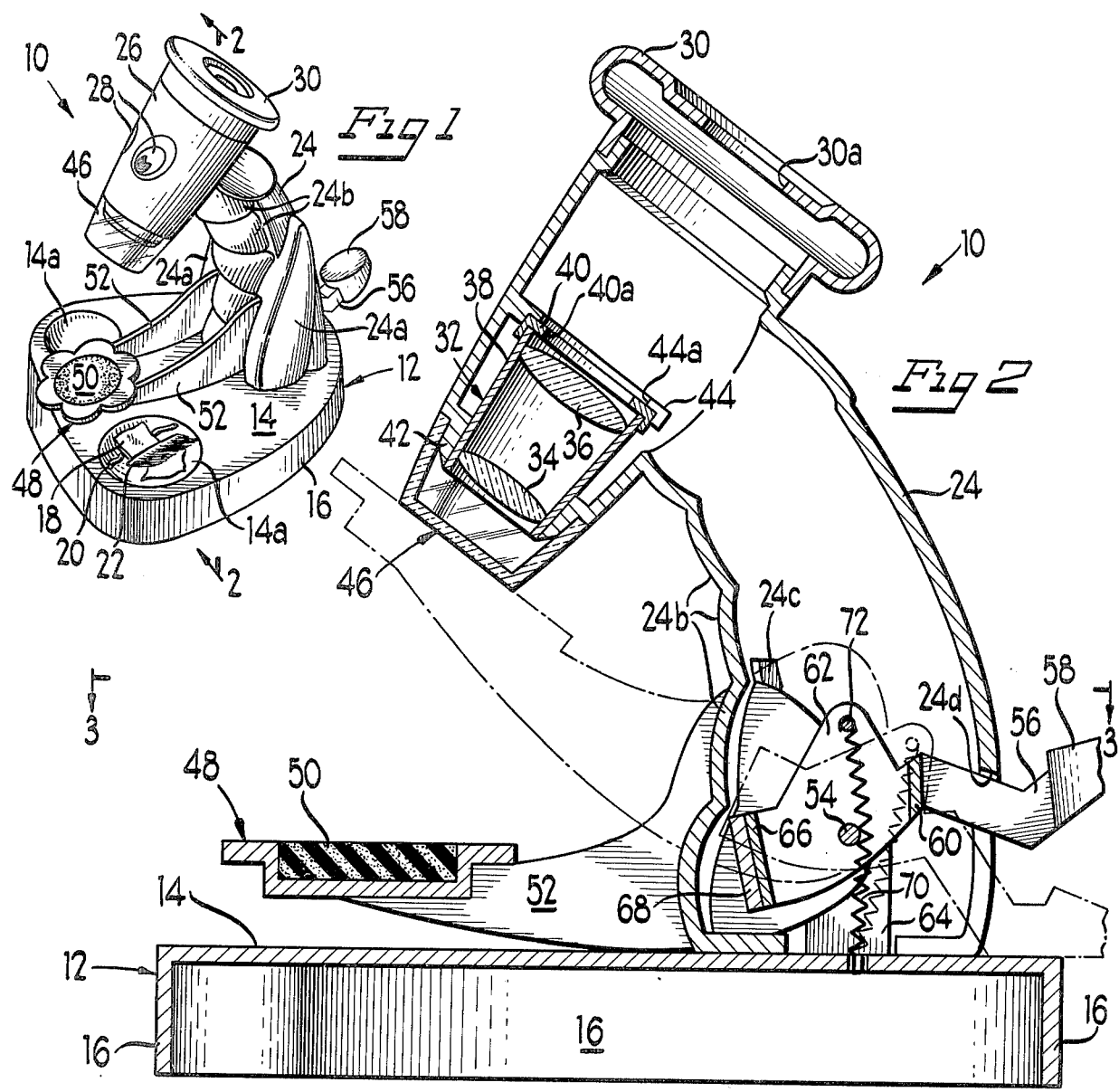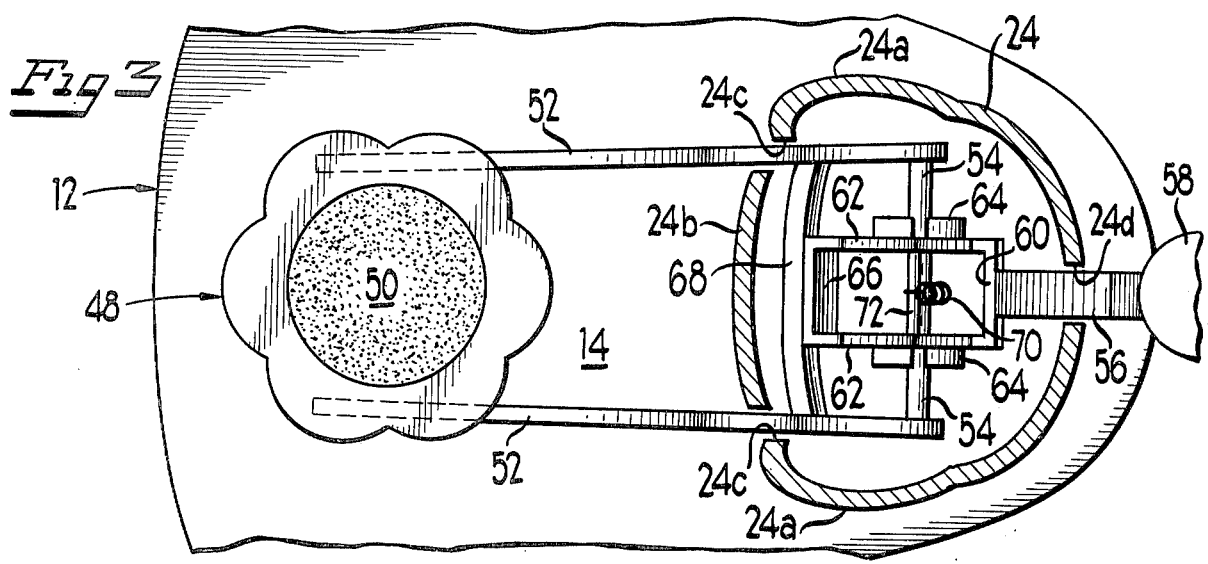

TOY MICROSCOPE

BACKGROUND OF THE INVENTION

1. Field of the Invention

The present invention relates to a new and improved microscope toy especially adapted for use by children of tender years. The microscope toy includes a magnifying lens for viewing objects and is shaped in the form of a toy character such as a grasshopper or other insect so that the microscope may also function merely as a play toy for a child when not being used as a microscope.

2. Description of the Prior Art

Relatively inexpensive microscopes for use by curious children have been provided and generally include magnifying glasses and other lens systems for enlarging objects being inspected. Normally, microscopes and lens structures of this type have little, if any, decorative features and are only used to perform the intended function of magnification of a viewed object. In the present invention, the apparatus functions not only as a microscope but in addition, it is decorated and shaped to resemble an animated figure such as a grasshopper or other insect-like character and thus the present invention finds use as both a functioning microscope and as a toy character especially suited for children's play.

SUMMARY OF THE INVENTION

It is an object of the invention to provide a new and improved toy microscope for children of tender years.

Another object of the invention is to provide a new and improved microscope toy which has a function as a microscope and also is provided with the dress and shape resembling a play character such as a grasshopper or other insect and thus is useful as a children's play toy when not functioning as a microscope.

The foregoing and other objects and advantages of the present invention are accomplished in a new and improved microscope toy for children including a base and a body shaped to resemble that of an insect. The body extends upwardly of the base and has a hollow head portion at the upper end. A lens is mounted in the hollow head portion which is provided with an eye piece on the upper end resembling a hat or cap worn by the insect character. The microscope toy includes a leg structure resembling the legs of a grasshopper which have an object support platform resembling a flower at the outer end adapted for supporting the object in position to be viewed through the lens in the hollow head. The leg structure is pivotally secured to the body adjacent the base and the platform is movable toward and away from the head between a lower position adapted for easy placement and removal of ojects and a viewing position wherein the objects are in close vicinity to the lens for viewing. An overcenter toggle mechanism is provided and permits the leg structure to be retained in either the lowered position or the viewing position. An actuating lever is provided for overcoming the overcenter toggle mechanism in order to pivot the leg structure and move the object platform upwardly into the viewing position.

BRIEF DESCRIPTION OF THE DRAWINGS

For a better understanding of the present invention, reference should be had to the following detailed description taken in conjunction with the drawings in which:

FIG. 1 is a perspective view of a microscope toy for children constructed in accordance with the features of the present invention;

FIG. 2 is a vertical cross-sectional view taken substantially along line 2—2 of FIG. 1; and FIG. 3 is a horizontal cross-sectional view taken substantially along line 3—3 of FIG. 2.

DESCRIPTION OF THE PREFERRED EMBODIMENT

Referring now more particularly to the drawings, therein is illustrated a new and improved microscope toy especially adapted and suitable for children of tender years. The microscope toy is referred to as a whole by the reference numeral 10 and as best illustrated in FIG. 1 is fashioned with a dress and shape to resemble a fictional play character such as a grasshopper or other insect. The toy includes a generally heart-shaped base 12, preferably formed of molded plastic material and including a relatively flat upper surface 14. A depending integrally formed skirt or edge 16 is provided around the periphery of the upper surface. As illustrated in FIG. 1, the upper surface is formed with a pair of spaced apart, spherically shaped, recesses 14a and 14b for holding objects to be viewed such as a piece of rag 18, a length of string 20, a feather 22, and a wide variety of other objects which a curious child may wish to view through the microscope.

The toy microscope includes an upstanding hollow body 24 having a tubular, hollow head portion 26 at the upper end. As best indicated in FIG. 1, the body 24 is provided with an irregular outer surface which resembles the body of a grasshopper or other insect and includes a pair of wings 24a on opposite sides and separate segments 24b on the underside or stomach portion of an insect body. The hollow head portion 26 is reduced in diameter toward its lower end and is decorated to provide a pair of eyes 28 on the upper surface at the midportion of the head as shown in FIG. 1. At the upper end, the head 26 is provided with a doughnut-shaped eye piece 30 having a central aperture 30a therein and shaped to resemble a sailor's hat or cap for the insect character.

Internally of the hollow head structure 26, the toy microscope is provided with a lens structure 32 employing a pair of spaced apart, concave microscope lenses 34 and 36. These lenses are mounted in coaxial alignment with the viewing opening 30a in the eye piece cap 30 and are held in spaced apart relation as illustrated by means of a frusto-conically tapered hollow lens holder 38. The lens holder is provided with an annular eye piece 40 at the upper end having a central aperture 40a coaxially aligned with the viewing aperture 30a as illustrated. The lower end portion of the lens holder is seated in a frusto-conically shaped, coaxial opening provided in a lower end wall 42 on the head structure and the annular eye piece is seated within an integrally formed annular supporting wall 44 having a circular opening 44a therein and projecting from the inside wall surface of the head. The open lower end of the lens holder 38 resembles the open mouth of the insect figure and to provide proper spacing between the lower lens 34 and an object to be viewed, the head structure is provided with a transparent, cup-like member 46 having a circular lower end wall and a frusto-conically shaped side wall as illustrated.

In accordance with the invention, a rag, string, feather or other objects to be viewed through the lens assembly 32 are supported for viewing on a platform 48 having a circular central portion 50 of relatively soft resilient material such as urethane foam or the like. The platform includes an outer peripheral edge portion shaped to resemble the petals of a flower. The platform is supported adjacent the outer end of a pair of legs 52 which are shaped to resemble the legs of a grasshopper and which are interconnected adjacent their inner ends internally of the hollow body 24 adjacent the lower portion thereof by means of a transverse pivot axle 54. Each leg extends into the interior of the hollow body through a vertical slot 24c defined between the body scales 24b and the adjacent outer wing structure 24a on the side of the body. The legs are pivotally movable from a generally horizontal position (shown in solid lines in FIG. 2) wherein the platform 48 is positioned for easy placement or removal of one or more objects to be viewed through the lenses and an upwardly extending, viewing position (shown in dotted lines in FIG. 2) wherein an object on the resilient cushion portion 50 of the viewing platform are pressed against the lower circular end wall of the transparent nose portion 46.

Pivotal movement of the legs between these alternate positions is initiated by means of an actuating lever 56 having an actuating button 58 integrally formed on the outer end thereof. The lever projects inwardly into the interior of the hollow body 24 through a slot 24d as best shown in FIGS. 2 and 3 and at the inner end, the lever is joined to a cross-member 60 secured between the rearward ends of a pair of side plates 62 mounted on the axle 54. The plates are positioned between a pair of upstanding legs 64 which provide support for the axle. The spaced apart side plates 62 are interconnected at the opposite ends by an integrally formed cross-member 66 which in turn is secured to a cross-member 68 interconnecting the legs 52. When the actuating button 58 is pressed downwardly from the position shown in FIG. 2 in solid lines to the position shown in dotted lines, the legs 52 pivot upwardly in a clockwise direction as illustrated.

In order to retain the flower-shaped platform 48 in either a lowered position (solid lines) or in an object viewing position (dotted lines), there is provided a toggle locking mechanism including a coil spring 70 connected at its lower end to the upper surface 14 of the base 12. As shown in FIG. 2, the spring extends upwardly from the base against one side of the axle 54 and is connected at its uper end to a cross-pin 72 spaced above the axle and interconnected between upwardly extending portions of the side plates 62. As illustrated in FIG. 2, the longitudinal axis of the spring 70 is bent or deflected when the legs are in their lowered position to provide the overcenter, toggle locking, for the legs in the lower position. When the activating button 58 on the lever 56 is pressed downwardly, however, the upper cross-pin 72 is pivoted in a clockwise direction relative to the stationary pivot axis of the axle 54 and the spring 70 is then effective to bias the legs 52 in a clockwise direction to move the viewing platform with any objects thereon up into the viewing position, wherein the objects on the central cushion 50 are pressed resiliently against the circular end wall of the nose 46. In this position, magnification of the objects is achieved when the object is viewed through the opening 38 in the eye piece 30. After viewing the objects may be returned with the platform 48 to the lower position by manual movement of the legs in a counterclockwise direction until the spring 70 is again moved into the overcenter toggle locking position as illustrated. The member 46 provides the proper spacing between the lens 34 and objects being viewed so that no lens focusing adjustment is required.

From the foregoing, it will be seen that the toy microscope can function both as a microscope and as a child's play toy resembling an insect-like character.

Although the present invention has been described with reference to a single illustrated embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A toy microscope, comprising:
    a base portion;
    a body extending upwardly from said base portion;
    a hollow head portion mounted at the upper end of said body in a stationary position, at an angle with respect to said base;
    lens means mounted in said hollow head portion for magnifying an object;
    a transparent closed end cup-shaped spacer mounted on the lower end of said lens means for maintaining a predetermined spacing between said lens means and said object;
    an object mounting platform for supporting an object to be viewed through said lens means; and
    a leg structure mounted on said upwardly extending body by means for supporting said platform for selective movement between a pair of alternative positions relative to said lens means to facilitate mounting of an object on said platform prior to movement thereof into contact with said transparent spacer for viewing.

2. The toy microscope of claim 1 including means for biasing the leg structure toward the viewing position with the platform in contact with the spacer.

3. The toy microscope of claim 1 wherein said biasing means includes a manually actuated lever which is depressed to move the leg structure toward said viewing position.

* * * * *